Patented July 29, 1930

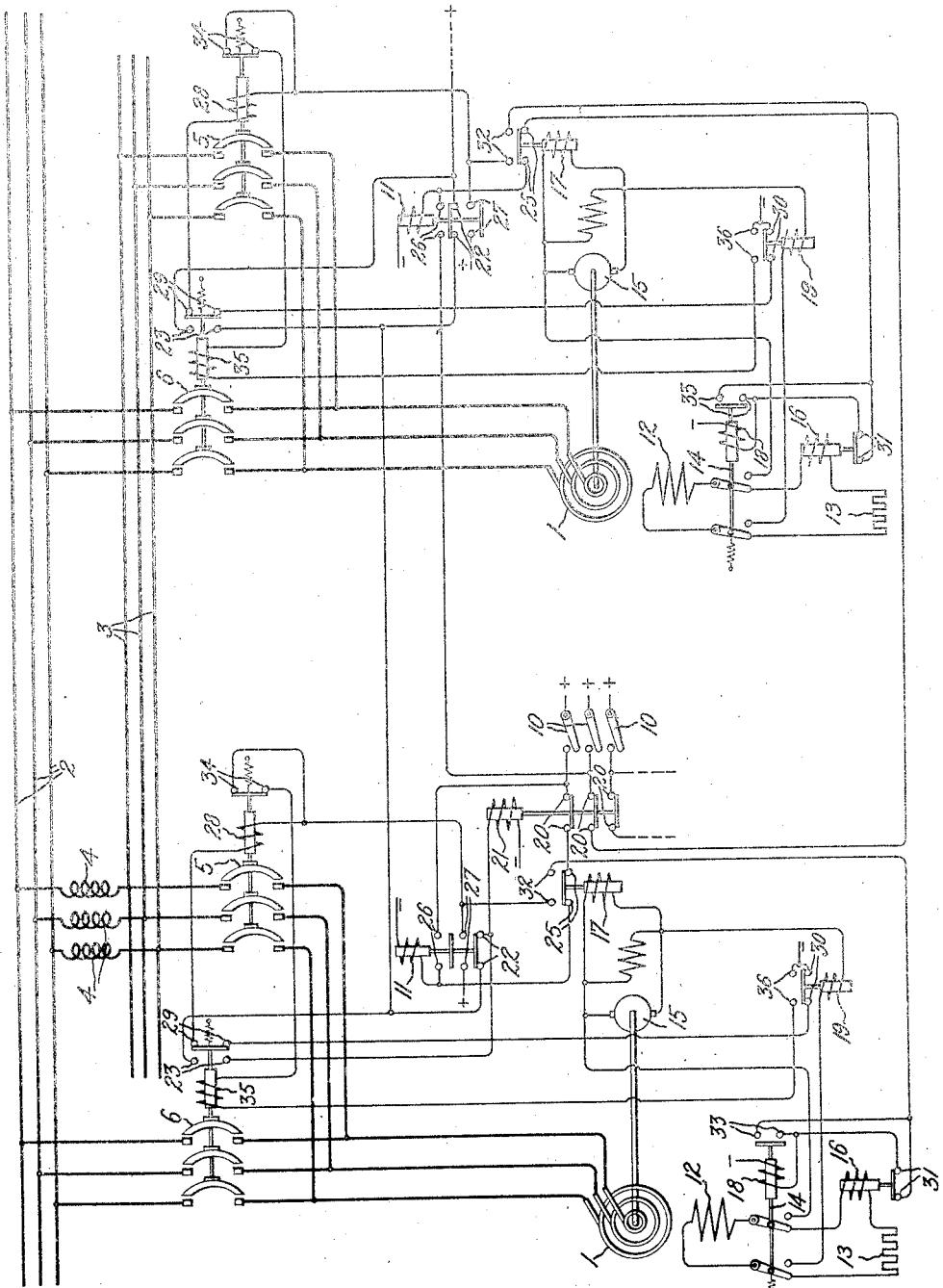

1,771,909

UNITED STATES PATENT OFFICE

HERMAN BANY, OF YEADON, PENNSYLVANIA, ASSIGNOR TO GENERAL ELECTRIC COMPANY, A CORPORATION OF NEW YORK

CONTROL SYSTEM

Application filed May 10, 1929. Serial No. 362,083.

My invention relates to control systems and particularly to systems for selectively controlling the connections of a plurality of electroresponsive devices to an electric circuit such for example as a control system for selectively starting a plurality of motors and it has for one of its objects an improved arrangement of the above character for effecting the starting of a plurality of motors through the medium of a common starting means.

Another object of my invention is to provide an improved arrangement for insuring against the simultaneous connection of a plurality of motors to a common starting device.

My invention will be better understood from the following description when taken in connection with the accompanying drawing and its scope will be pointed out in the appended claims.

In the accompanying drawing which diagrammatically shows a control arrangement for a plurality of dynamo electric machines embodying my invention, I have shown a control arrangement for a plurality of synchronous motors but it is obvious that my invention is applicable to arrangements for controlling the starting of other types of dynamo electric machines.

Referring to the drawing, a plurality of synchronous motors 1 are shown as being arranged to be supplied with current from a common supply circuit 2. It is to be understood, however, that my invention is not limited to a control arrangement for two motors but it may be used with a control arrangement for as many motors as desired.

In order to effect the starting of each motor, I provide a common starting bus 3 the voltage of which is relatively low with respect to the voltage of the circuit 2. Suitable voltage reducing means such as reactors 4 are interposed between the circuit 2 and the starting bus 3 so as to reduce the voltage of the bus 3 with respect to the circuit 2. Each synchronous motor 1 has associated therewith a starting switch 5 which when closed connects the motor armature winding to the starting bus 3 so that a relatively low voltage may be impressed upon the motor armature winding to effect the starting thereof. Each motor also has associated therewith a running breaker 6 which when closed connects the armature winding of the motor directly across the circuit 2 so that a relatively high voltage may be impressed upon the motor armature winding after the motor has been started.

Any suitable control means, examples of which are well known in the art, may be provided for controlling the sequential operation of the switches 5 and 6 associatd with each motor 1 so as to effect the starting thereof. As shown in the drawing, each motor has associated therewith a master element, shown as a manually controlled switch 10, which when closed effects the energization of a master relay 11. Each master relay 11 when energized effects the closing of the associated starting switch 5 so that the armature winding of the synchronous motor is connected to the starting bus 3 to effect the starting of the motor. While the motor is accelerating to synchronous speed during the starting operation thereof, the field winding 12 of the synchronous motor is short-circuited through a discharge resistor 13. When the motor speed reaches a predetermined value a suitable speed responsive device effects the operation of a field switch 14 to disconnect the motor field winding 12 from the discharge resistor 13 and to connect the field winding 12 to a suitable source of excitation such as an exciter 15 driven by the synchronous motor. As shown in the drawing, the speed responsive device is a current relay 16 which is connected so as to be energized in response to the current induced in the motor field winding 12 by transformer action while the motor is operating below synchronous speed and which cooperates with a voltage relay 17, responsive to the exciter voltage, to effect the energization of the closing coil 18 of the field switch 14 when the induced current in the field winding 12 is below a predetermined value and the exciter voltage is above a predetermined value. After the field switch 14 closes the starting switch 5 is opened and the running switch 6 is closed. As shown in the drawing, this result is accomplished by means of a current relay 19 which is responsive to the current supplied to the motor field winding 12 by the exciter 15. When the motor field current builds up above a predetermined value the field relay 19 operates to effect the opening of the starting switch 5 and the closing of the running switch 6.

In order to prevent more than one starting switch 5, from being closed at any instant, I provide in accordance with my invention an arrangement whereby the closing of a control switch 10 completes an energizing circuit for its master relay 11 only when all of the running switches 6 associated with the other energized master relays 11 are closed. In the particular embodiment of my invention shown in the drawing, this result is accomplished by providing in the energizing circuit of each of the master relays 11, a separate set of contacts 20 of a control relay 21 which, in turn, is controlled by all of the master relays 11 and running switches 6 so that if any master relay 11 is energized and its associated running switch 6 is open the energizing circuits of all of the deenergized master relays are open. This result is obtained by connecting, in series in the energizing circuit of the control relay 21, the master relay contacts 22 which are closed when the respective master relays 11 are deenergized and by connecting in shunt around each of the contacts 22 the associated running switch auxiliary contacts 23 which are closed when the respective running switches 6 are closed. Therefore, when the master relay 11 is energized, the control relay 21 is deenergized and maintains the energizing circuits of all of the other deenergized master relays open until the running switch 6 associated with each energized master relay 11 is closed.

The operation of the arrangement shown in the drawing is as follows:

When both of the synchronous motors 1 are not in operation, the control devices associated with each motor are in the positions shown in the drawing. The control relay 21 maintains all of its contacts 20 closed since an energizing circuit is completed for the winding of the relay through the series connected contacts 22 of the deenergized master relays 11.

When it is desired to start any of the synchronous motors 1 the associated control switch 10 is closed. The closing of this switch completes an energizing circuit for the associated master relay 11 through a set of contacts 20 of the energized control relay 21 and the contacts 25 of the associated deenergized exciter voltage relay 17. The master relay 11 by closing its auxiliary contacts 26 completes a locking circuit for itself which is independent of the contacts 25 of the associated exciter relay 17 and the contacts 20 of the control relay 21 so that the energized master relay 11 is not deenergized by the subsequent energization of its associated relay 17 and deenergization of the control relay 21.

The master relay 11 by opening its contacts 22 deenergizes the control relay 21 so that it opens all of its contacts 20 in the energizing circuits of all of the master relays 11 so that none of the deenergized relays can be energized during the starting operation of the motor 1 associated with the master relay 11 which has just been energized. The master relay 11 by closing its contacts 27 completes an energizing circuit for the closing coil 28 of the associated starting switch 6. This circuit also includes auxiliary contacts 29 on the associated running switch 6 and contacts 30 of the associated motor field relay 19 which is deenergized so that the starting switch can be closed only when the associated running switch is open and the field of the associated motor 1 is not excited. The closing of the switch 5 impresses a relatively low voltage on the armature winding of the associated synchronous motor 1 to effect the starting thereof. While the motor is accelerating to synchronous speed, the current induced in the motor field winding 12 by transformer action maintains the contacts 31 of the associated current relay 16 open. When the motor reaches substantially synchronous speed the associated current relay 16 closes its contacts 31 and if the voltage of the associated exciter 15 is above a predetermined value so that the contacts 32 of the associated exciter voltage relay 17 are closed, an energizing circuit is completed for the closing coil 18 of the associated field switch 14. This energizing circuit of the closing coil 18 also includes the contacts 27 of the master relay 11. The closing coil 18 when energized disconnects the motor field winding 12 from the discharge resistor 13 and connects the field winding across the terminals of the associated exciter 15. The field switch 14 by closing its auxiliary contacts 33 completes a holding circuit for itself which is independent of the contacts of the associated current relay 16. As soon as the motor field current builds up to a predetermined value, the associated motor field relay 19 opens its contacts 30 in the circuit of the closing coil 28 of the starting switch 5 so that the motor is disconnected from the starting bus 3. As soon as the starting switch 5 closes its auxiliary contacts 34, an energizing circuit is completed for the closing coil 35 of the running switch 6 to connect the armature winding of the motor directly across the circuit 2. The energizing circuit of the closing coil 35 also includes the contacts 27 of the associated master relay 11, the contacts 34 of the associated starting switch 5, and the contacts 36 of the associated motor field relay 19.

When the running switch 6 closes its auxiliary contacts 23, which are connected in shunt with the contacts 22 of the associated master relay 11, it completes the energizing circuit of the control relay 21 so that it recloses its contacts 20 in the energizing circuits of all of the master relays 11 so that the subsequent closing of any of the associated control switches 10 can effect the operation thereof.

It will be noted that, in accordance with my invention, after any control switch 10 has been closed to effect the energization of its associated master relay 11 the subsequent closing of another control switch 10 cannot effect the operation of its associated master relay 11 until the running switch 6 associated with the first mentioned master relay has closed.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a plurality of dynamo electric machines, an electric circuit, a plurality of switches associated with each machine for establishing starting and running connections between the associated machine and said circuit, means associated with each machine for effecting the successive operation of the associated switches including a master relay and control means for controlling the energization thereof, and means controlled by each master relay and its associated running switch for preventing the energization of another master relay when any one of said relays is energized and the associated running switch is open.

2. In combination, a plurality of electroresponsive devices, an electric circuit, voltage reducing means, a switch associated with each device for interposing said voltage reducing means between the associated device and said circuit, a switch associated with each device for connecting it directly to said circuit, means associated with each device for effecting the successive operation of the associated switches including a master relay and control means for controlling the energization thereof, and means controlled by each master relay and the associated switch for connecting the associated device directly to said circuit and for preventing the energization of another master relay when any one of said relays is energized and the associated switch for connecting the associated device directly to said circuit is open.

3. In combination, a plurality of electroresponsive devices, an electric circuit, voltage reducing means, a switch associated with each device for interposing said voltage reducing means between the associated device and said circuit, a second switch associated with each device for connecting it directly to said circuit, control means associated with each device for effecting the closing of the switch associated therewith for interposing said voltage reducing means between it and said circuit, and means for preventing said voltage reducing means from being simultaneously interposed between a plurality of said devices and said circuit including means controlled by each control means and said second switch of the associated device for preventing another control means from effecting the operation of its associated switch when any one of said control means is in a position to effect the energization of its associated electroresponsive device and the associated second switch is open.

4. In combination, a plurality of motors, an electric circuit, a switch associated with each motor for establishing starting connections between the associated motor and said circuit, a switch associated with each motor for establishing running connections between the associated motor and said circuit, control means associated with each starting switch for effecting the closing thereof, and means for preventing the simultaneous closures of two of said starting switches including means controlled by each control means and the running switch of the associated motor for preventing another control device from effecting the closing of its associated starting switch when any one of said control devices is in a position to effect the closing of its associated starting switch and the associated running switch is open.

5. In combination, a plurality of motors, an electric circuit, a starting bus, a starting switch associated with each motor for connecting it to said starting bus, a running switch associated with each motor for connecting it to said circuit, control means associated with each starting switch for effecting the operation thereof, means associated with each motor for effecting the opening of its starting switch and the closing of its running switch, and means for preventing a plurality of said starting switches from being simultaneously closed including means controlled by said control means and said running switches for preventing another control means from effecting the closing of its associated starting switch when any one of said control means is in a position to effect the closing of its associated starting switch and the running switch of the associated motor is open.

6. In combination, a plurality of motors, an electric circuit, a starting bus, voltage reducing means connected between said circuit and said bus, a starting switch associated with each motor for connecting it to said starting bus, a running switch associated with each motor for connecting it to said circuit, means associated with each motor for effecting the successive operation of the associated starting and running switches including a master relay and control means for controlling the energization thereof, and an energizing circuit for each master relay controlled by the positions of the other master relays and the said running switches whereby a second master relay can be energized by its respective control means while another master relay is energized only when the running switch associated with said last mentioned energized master relay is also closed.

7. In combination, a plurality of motors, an electric circuit, a starting bus, voltage reducing means connected between said circuit and said bus, a starting switch associated with each motor for connecting it to said starting bus, a running switch associated with each motor for connecting it to said circuit, means associated with each motor for effecting the successive operation of the associated starting and running switches including a master relay and control means for controlling the energization thereof, an energizing circuit for each master relay, contacts in each energizing circuit, and means controlled by said master relays and their associated running switches for controlling said contacts so that when any one of said master relays is energized the energizing circuit of another master relay can be completed only when the running switch associated with the energized master relay is closed.

In witness whereof, I have hereto set my hand this 6th day of May, 1929.

HERMAN BANY.